United States Patent [19]

Pedraza et al.

[11] Patent Number: 5,237,640

[45] Date of Patent: Aug. 17, 1993

[54] GUIDE FOR AN OPTICAL FIBER CABLE HAVING MINIMUM BEND RADIUS

[75] Inventors: Luis Pedraza, Hyde Park; Gary T. Wenger, Duxbury, both of Mass.

[73] Assignee: Telco Systems, Inc., Norwood, Mass.

[21] Appl. No.: 890,694

[22] Filed: May 29, 1992

[51] Int. Cl.[5] .............................................. G02B 6/00
[52] U.S. Cl. .................................... 385/136; 385/134; 385/137; 385/100
[58] Field of Search ................ 385/14, 15, 16, 24, 385/32, 100, 134, 135, 136, 137, 88, 89

[56] References Cited

U.S. PATENT DOCUMENTS

| | | | |
|---|---|---|---|
| 4,518,817 | 5/1985 | Kirby et al. | 385/135 X |
| 4,730,893 | 3/1988 | Burmeister | 385/136 X |
| 4,818,054 | 4/1989 | George et al. | 385/135 X |
| 4,911,510 | 3/1990 | Jenkins | 385/136 X |
| 4,941,720 | 7/1990 | Barwig et al. | 385/135 X |
| 4,971,421 | 11/1990 | Ori | 385/135 X |
| 5,052,773 | 10/1991 | Noon et al. | 385/136 |
| 5,090,792 | 2/1992 | Koht et al. | 385/135 X |
| 5,115,260 | 5/1992 | Hayward et al. | 385/136 X |
| 5,129,030 | 7/1992 | Petrunia | 385/135 |
| 5,133,038 | 7/1992 | Zipper | 385/135 |

Primary Examiner—Brian Healy
Attorney, Agent, or Firm—Wolf, Greenfield & Sacks

[57] ABSTRACT

A cable guide assembly for use with a panel which has a plurality of adjacent mounted circuit members, such as panel mounted telephone switching circuits, with a plurality of fiber optic or other cable whose performance would be impaired if bent beyond a minimum bend radius extending therefrom. The guide assembly manages the running of the cable toward either end of the panel from each circuit member in a manner such that the cable cannot be bent beyond its minimum bend radius. In particular, an effective curve surface is provided at each point where the cable changes direction, with the cable passing over such surface and such surface having a radius which is not less than the minimum bend radius of the cable.

16 Claims, 2 Drawing Sheets

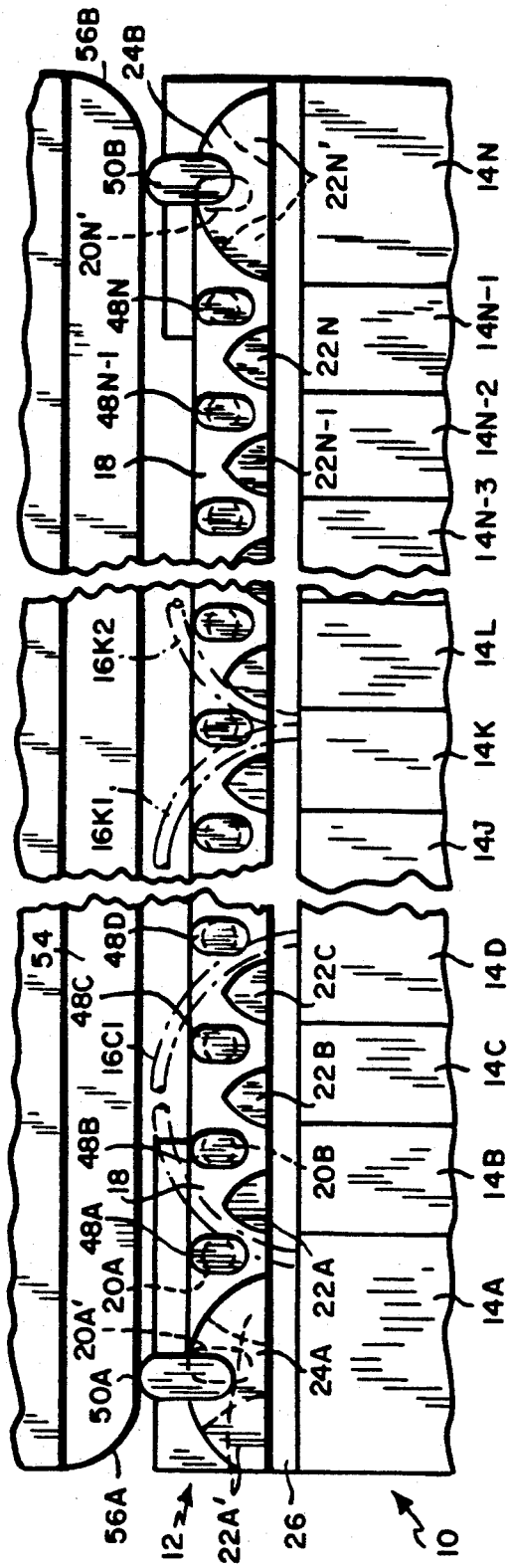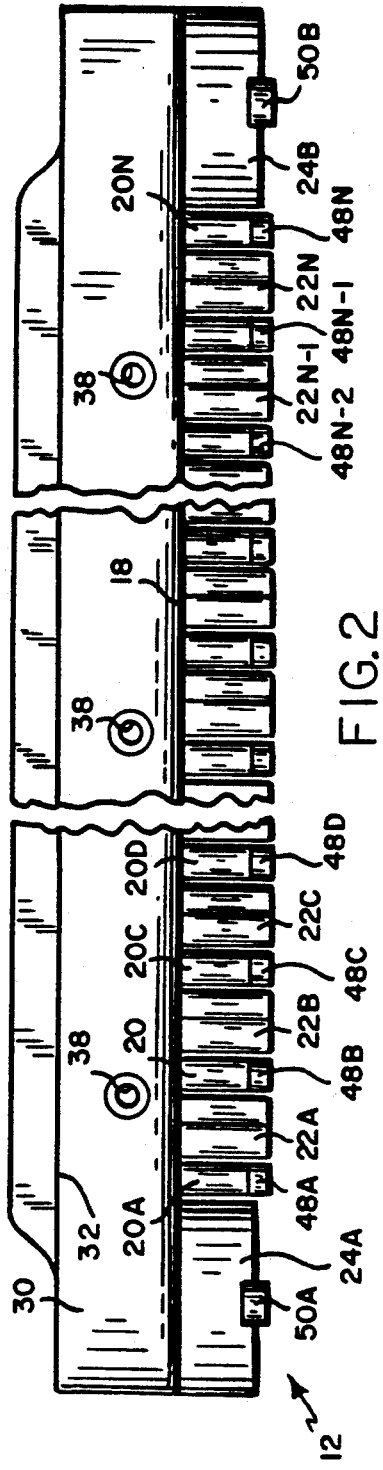

GUIDE FOR AN OPTICAL FIBER CABLE HAVING MINIMUM BEND RADIUS

FIELD OF THE INVENTION

This invention relates to cable guides and more particularly to a cable guide for use with fiber optic or other cables which may be damaged or otherwise have their performance adversely affected if bent beyond a predetermined minimum bend radius.

BACKGROUND OF THE INVENTION

Because of their large data capacity, fiber optic cables are finding increasing application in telephony, computer systems and other applications where large amounts of information must be transmitted. However, unlike metal wires, fiber optic leds or cables are brittle and may break if bent beyond some bend radius. For bending radiuses greater than that at which cracking or breaking may occur, performance of the cable may still be degraded as a result of defraction within the leads caused by the bending. For example, the bend radius for breakage for fiber optic cables frequency used in telephony applications may be approximately ½ inch, but degradations in performance may occur at larger radiuses, starting at a bend radius of approximately 1". In the discussion to follow, the bend radius at which degradation becomes noticeable will sometimes be referred to as the "minimum bend radius".

Further, since a cable may be covered, or only selected fibers in a cable may break, such a break may not be detected until there has been loss of data; and the break may then be difficult to localize and may be both difficult and expensive to correct. It is, therefore, desirable when such cables are being handled, that suitable guides be provided to assure that the cable is not bent beyond its minimum bend radius.

One of the most likely locations for a break or other degradation in a fiber optic cable as a result of overbending is at the switching panels of a telephone central office. Typically, a large number of interconnect switching circuits or other types of circuits are mounted adjacent each other in a panel with cables extending from a selected side or sides of each of the circuits. In one application, there are six fiber optic cables extending from each circuit. Some of these cables maybe inputs and others outputs for the circuit and it is desirable that cables leaving a given circuit be able to extend toward either end of the panel to interconnect with other circuits on the panel or with circuits and locations external to the panel. However, to avoid undesirable signal degradations or breaks occurring in the cables, it is important in running the cables from the circuit board through the panel that the cables not be overbent at any point in their travel path. Existing systems for managing and controlling the running of fiber optic cables in a switching panel do not provide specific guides for assuring that cables are not overbent as they are run through the panel while allowing for multiple cables and multiple routing directions. Similar problems, also unresolved, may exist in various coaxial cable systems where characteristic impedance may be changed or wire or shielding cracked or broken if overbending occurs.

A need therefore exists for a cable guide for use with telephone central office switching panels and other circuit panels using fiber optic or other cables which may be damaged if overbent to manage and control the running of such cables in a manner so as to protect against overbending.

SUMMARY OF THE INVENTION

In accordance with the above, this invention provides a cable guide assembly for use with a panel which has a plurality of adjacent-mounted, possibly removable, circuit members, such as panel mounted telephone switching circuits, with a plurality of fiber optic cables or other cables whose performance would be impaired if bent beyond a minimum bend radius extending therefrom. The guide assembly manages and guides the running of the cable toward either end of the panel from each circuit member in a manner such that the cable cannot be bent beyond its minimum bend radius. Protection against costly and difficult to detect breaks or other degradations in performance in the cables is thus provided.

More particularly, the cable guide is mounted to the panel on the side or sides of the circuit members from which cables are extending. The cable guide has a first guide for each circuit member, which guide is spaced from a point on the circuit member from which cables extend. A second guide is positioned on either side of each first guide, there thus being a second guide between each pair of adjacent first guides. Each second guide is spaced from each adjacent first guide by a distance greater than the thickness of the cable and is closer to the circuit member than the adjacent first guide. Each second guide has two sides, each of which extends from a point on the second guide adjacent a cable extension point of a circuit member toward the first guide for the adjacent circuit member at a curve having a radius which is not less than the minimum bend radius for the cable. The position of the first guide for the adjacent circuit member relative to the second guide is such that the first guide is generally an extension of the curve of the second guide side for cable being guided by such side.

A means is also provided for retaining cable between the first guide for the circuit member from which cable extends and a selected one of the adjacent second guides. For a preferred embodiment, the means for retaining cable includes an enlarged end portion on at least one of the first guides and/or second guides. For the preferred embodiment, the enlarged end portions are enlarged heads on the ends of the first guides.

The depths of each first guide and each second guide are preferably such that a plurality of cables may lay adjacent each other when passing over the guides. In particular, where there are N cables extending from each circuit member, the depth of each guide should be such that the N cables may lay adjacent each other when passing over the guide.

For the preferred embodiment, each first guide is in the form of a substantially cylindrical dowel and each second guide has a generally triangular cross section with the side adjacent the circuit members being substantially flat or having some other selected shape, and the other two sides having the indicated curve. The second guides at the ends of the cable guide preferably have a generally semicircular cross section with a radius greater than the minimum bend radius. A suitable means may be provided for retaining the cable on such end guides.

A shelf may be provided which extends above and behind a wall from which the first and second guides extend, cable being positionable on the shelf after passing between a selected first guide and second guide. The corner at the junction of the wall and the shelf preferably has a curve with a radius greater than the minimum bend radius. A ledge corner having substantially the same radius is provided above the point where cable exits the cable guide assembly at each end to limit the bend radius on upwardly exiting cables. For the preferred embodiment, where the cables are fiber optic cables, which cables may have their performance degraded or break if bent beyond a radius of approximately 1 inch, the curve radius for the second guide sides and for the shelf and ledge corners is preferably approximately one inch.

The foregoing and other objects, features and advantages of the invention will be apparent from the following more particular description of a preferred embodiment of the invention as illustrated in the accompanying drawings.

In the Drawings

FIG. 1 is a partially broken front elevation view of a portion of a circuit panel having a cable guide for a preferred embodiment of this invention mounted thereto.

FIG. 2 is a top plan view of the cable guide shown in FIG. 1.

DETAILED DESCRIPTION

Figure 3:
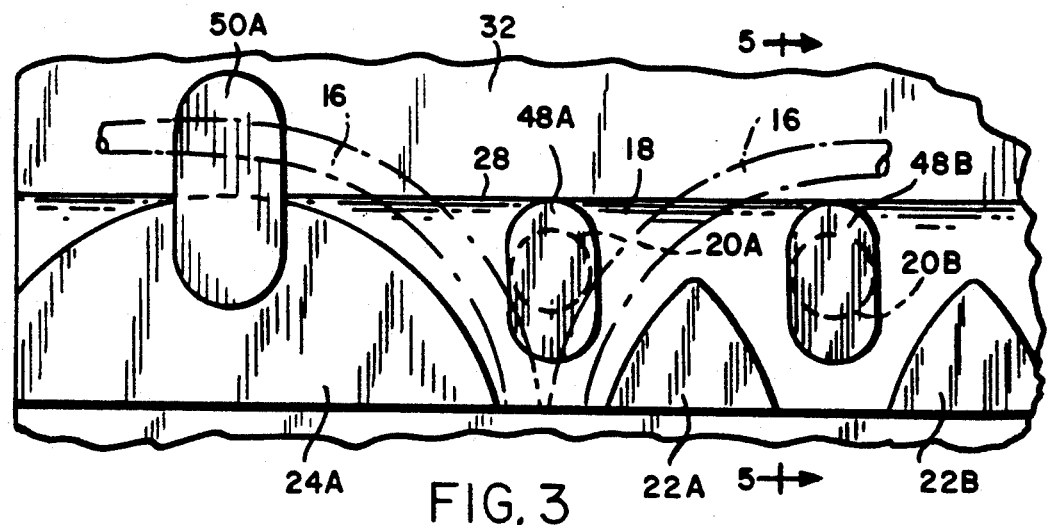
FIG. 3 is an enlarged front elevation view of a portion of the cable guide shown in FIG. 1.
Figure 4:
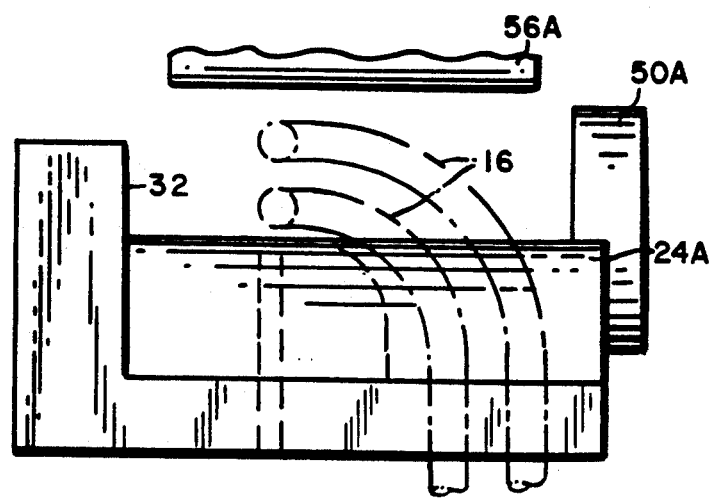
FIG. 4 is a side elevation view of the cable guide shown in FIGS. 1 and 3.

Referring to the figures, a panel 10 has the guide assembly 12 of this invention mounted on top thereof. Panel 10 has positions therein for a plurality of circuit elements 14A–14N, which elements may all be of the same size or may be of different sizes as shown in the figures. Panel 10 may, for example, be a telephone switching panel with each of the circuit elements 14 being a telephone switching circuit.

Each circuit element 14 has a plurality of fiber optic cables 16 extending from the top thereof, only a few exemplary ones of such cables being shown in the figures. Cables may also extend from the bottom of each circuit element. For one telephony application in which the invention may be utilized, there are six cables 16 extending from the top of each circuit 14. For purposes of this invention, cables 16 will be assumed to each be made of a plurality of optical fibers, which fibers are brittle and may crack or break, or may have their performance degraded as a result of defractions within the leads, if the cable is bent beyond some minimum bend radius. Such a crack, break or defraction could block or otherwise interfere with the proper flow of data through the cable. Since in many instances only some of the fibers in a cable would break for a given overbending, and since the cable may be covered, such a break may go undetected until there is a loss of information of erroneous information passed through the cable. At that point, it may be difficult to localize the break in the cable and replacing the cable, particularly if the cable has a long run, may be difficult and extensive.

It is, therefore, desirable to avoid overbending of the cable during the installation and wiring of a circuit element 14 and of the fiber optic cables connected thereto. In managing the running of cables 16 in a manner so as to prevent overbending, account must be taken of the fact that each cable 16 may need to run toward either end of the panel 10 from a given circuit element and that such output cables may connect either to other circuit elements 14 on the same panel 10 or to circuits or devices external to panel 10.

Guide assembly 12 performs the function of guiding and managing the running of cables 16 so as to avoid overbending. While assembly 12 is shown mounted to the top of panel 10, where cable 16 exits from the bottom of at least some of the circuit elements 14, a guide assembly could also be mounted to the bottom of the panel.

Figure 5:
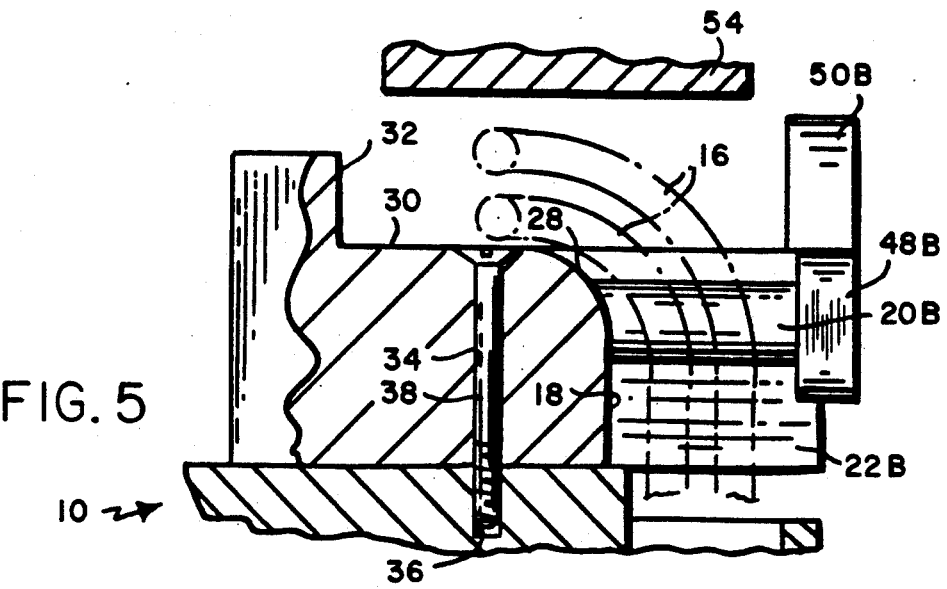
FIG. 5 is a side sectional view taken along the line 5—5 in FIG. 3.

Assembly 12 has a wall 18 with a plurality of first dowel-shaped guides 20A–20N and a plurality of second guides 22A–22N having a generally triangular cross section extending therefrom. Wall 18 terminates at each end in an end guide 24A, 24B. The upper corner 28 of wall 18 is curved for reasons to be discussed later with a curve having a radius of curvature R, where R is at least equal to the minimum curve radius for the fiber optic cables. Extending rearward from wall 18 at corner 20 is a generally horizontal shelf 30 having a rear wall 32 extending upward therefrom. A plurality of screw holes 34 are formed through shelf 30, each of which mates with a corresponding screw hole 36 in panel 12 (FIG. 5). A screw 38 passes through each hole 34 and corresponding hole 36 to hold guide assembly 12 in place on panel 10. Screws 38 are flush mounted with shelf 30 when the guide assembly and panel are fully screwed together. Suitable elements may be provided, if required, to further secure the guide assembly and panel together. The guide assembly and panel may also be molded or otherwise formed together, may be glued together, or may be held together in other suitable ways, either in addition to or instead of screws 38.

Each first guide 20 has an enlarged oval head 48 formed at its distal end. The spacing between each dowel 20 and the adjacent guide 22 at each point along such spacing is preferably at least twice the thickness of diameter of each cable 16 to allow removal of inner cables without removing outer adjacent cables. The spacing between each head 48 and the distal end of each adjacent guide 22 is slightly greater than the thickness of cable 16 at all points along such spacing. Each second guide 22 has a generally triangular cross section with the bottom of a second guide being substantially flat and the two side walls extending upward with a radius R' which is not less than (i.e. at least equal to) the minimum bend radius of the cable. For a preferred embodiment, the radius R and the radius R' are substantially the same. In particular, assuming the fiber optic cable utilized has a minimum bend radius of approximately one inch the radiuses R and R' would be approximately one inch for a preferred embodiment. However, the radiuses R and R' could be different so long as each of these radiuses is at least equal to the minimum bend radius for the particular cable being used.

Further, as may be best seen in FIGS. 1 and 3, the guide 20 on the side of a guide 22 to which cable 16 extends when passing over a given side of a guide 22 is generally positioned so as to form an extension at the radius R', or at another radius not less than the minimum bend radius, of the second guide side. Thus, cable 16C1 passes over the right side of guide 22C and over guide 20C, guide 20C forming an extension of the right side of guide 22C at the radius R'. As may be best seen in FIGS. 2 and 5, each guide 20 and 22 has a depth sufficient such that N cables may pass over the guide laying side-by-side of the preferred embodiment, where N is the number of cables exiting a given circuit element 14. This, if six cables (i.e. three input and three output cables) exit each given element 14, the length of each guide (i.e. the distance the guide extends from the wall 18) would be sufficient so that six cables could lay adjacent each other on each of the guides.

However, since there are many circuit members 14 in each panel, and the cables from each of these circuit members may extend in either direction for a substantial distance across the panel, there may not be enough space across the guides for cables to pass thereover. Shelf 30 is therefore provided on which cables may be moved after passing between the appropriate guides 20 and 22. As previously discussed, some of the cable may extend along guide assembly 12 to another circuit element on the panel, while other cables extend to the end of the panel to interconnect with other panels or circuitry. The latter cables are the ones most advantageously put on shelf 30.

Since cables exiting guide assembly 12 on either end, from either the end first guide 20A or 20N or from shelf 30, pass over the adjacent end guide 24A or 24B, these guides should also be radiused with a radius not less than the minimum bend radius in order to prevent excessive bending of the cable. An oval projection 50A, 50B is attached to project above the top surface of the distal end of guides 24A and 24B, respectively, at substantially the highest point on such guides to keep cable passing over guides 24 from slipping off the ends thereof.

Where the enlarged end circuit elements 14A and 14N have cables extending from an additional point near the center thereof, rather than only from the right side, the end guides 24A and 24B may be segmented as shown in dashed lines in FIG. 1 to form a guide 20A', 20N' over such central exit point with a guide 22A', 22N' on either side thereof. The projections 50 could be mounted to the guide sections 20 or the heads 48 on these guides could be extended to perform the function of these projections. The segmenting of guides 24 would only extend to wall 18 and the segmented guides would still perform the same function described for these guides above.

In the figure, a ledge 54 is shown above the guides 20 and 22 and shelf 30, the ledge having rounded corners 56A, 56B at its ends, the radius for the rounded corners also being not less than the cable minimum bend radius. Corners 56A, 56B prevent overbending of cable exiting upward from the guide assembly. Corners 56A, 56B may substitute for guides 24A, 24B where cables 16 only exit assembly 12 upward. Ledge 54 may be present only on the end of the guide assembly 12 or may extend as shown over the entire guide assembly.

In operation, each first guide 20 is positioned over substantially the point of the corresponding circuit element 14 where cable 16 exits. Cable 16 exiting the circuit element may thus be run to either side of guide 20, running to the left side of guide 20 if the cable is to extend to the left and to the right side of guide 20 if cable is to run to the right. Each cable is manually or automatically run through the space between head 48 of the guide 20 and the guide 22 on the side of the guide 20 in which the cable is to extend. For the preferred embodiment, this space is greater than the diameter of the cable to avoid damage to the cable when being fitted therein. However, if this space is smaller to hold cable in place, and to the extent the cable is not elastic enough to be fit between head 48 and the adjacent guide 22 without damage to the cable, head 48 or the adjacent distal end of guide 22 may be formed of a slightly resilient material, or the guides may flex slightly with respect to rear wall 18, so that cable may be fit between an enlarged end portion or head 48 and the distal end of the adjacent guide 22 without damage to the cable.

Once fitted into the spacing on the proper side of the corresponding guide 20, the cable extends in the direction it is being run over the next adjacent guide 20, which, as previously indicated, is generally an extension of the radius of the side of guide 22 over which the cable is passed, and then continues in the direction it is being run either passing over the tops of successive guides 20 or being pushed back onto shelf 30. Since the cable is relatively compliant, it tends to straighten after being run so as to bear against guide 20 rather than 22 and to thus be behind head 48. This assures that the cable remains on the guides.

If the cable is to exit from the panel, the cable ultimately passes over the appropriate one of the guides 24 or corners 56 before exiting the guide assembly. If the cable is to interconnect to one of the circuit elements 14, the cable at some point, as shown for the cable 16C1, passes over a first guide (i.e. guide 20B for cable 16C1) and over, for example, the left side of guide 22A, passing between this guide and guide 20A into circuit element 14A.

A guide assembly for managing the running of cable from a panel is thus provided, which assembly assures against excessive bending of the cable during the running thereof. While for the preferred embodiment, an enlarged head 48 has been shown on each first guide 20 to assure against cable slipping off the end of the guides, this objective could be achieved by providing an enlarged end for either one or both of the guide members, although for reasons discussed, the embodiment shown is preferred. Other shapes for the enlarged ends and other suitable means for preventing cable from coming off the end of the guides could also be utilized. Further, while the guide assembly 12 for the preferred embodiment is configured to operate with a particular panel configuration, various modifications in the design could be made to permit the invention to be practiced with other types of panels. In particular, as mentioned, where cables exit the bottom or from another location on the circuit members 14, guide assemblies 12 could be provided adjacent such location, either in addition to or instead of the location shown. The radiuses R and R' could also be different for different types of cable, so long as all radiuses are not less than the minimum bend radius for the cable utilized.

Thus, while the invention has been particularly shown and described above with reference to a preferred embodiment, the foregoing and other changes in form and detail may be made therein by one skilled in the art without departing from the spirit and scope of the invention.

What is claimed is:

1. A cable guide for use with a panel having a plurality of adjacent mounted circuit members, each of which has a plurality of cables extending therefrom in at least a first direction, said cables having a minimum bend radius below which performance of the cable may be impaired, the cable guide comprising:

means for mounting the cable guide to the panel on the first direction side of the circuit members;

a first guide for each circuit member, which guide is spaced from a point on the circuit member from which said cables extend; and a second guide positioned on either side of each first guide, there thus being a second guide between each pair of adjacent first guides, each second guide being space from each adjacent first guide by a distance greater than the thickness of said cable, being closer to said circuit members than adjacent first guides, and having two sides, each of which extends from a point on the second guide adjacent the cable extension point of a circuit member toward the first guide for the adjacent circuit member at a curve having a radius not less than said minimum bend radius, the position of the first guide for the adjacent circuit member relative to the second guide being such that said first guide is generally an extension of said curve for cable being guided by the side.

2. A cable guide as claimed in claim 1 including means for retaining cable between the first guide for the circuit member from which the cable extends and a selected one of the adjacent second guides.

3. A cable guide as claimed in claim 2 wherein said means for retaining cable includes an enlarged end portion on at least one of the first guides and the second guides.

4. A cable guide as claimed in claim 3 wherein said enlarged end portions are enlarged heads on the ends of the first guides.

5. A cable guide as claimed in claim 1 wherein the depth of each first guide and each second guide are such that a plurality of cables may lay adjacent each other when passing thereover.

6. A cable guide as claimed in claim 5 wherein there are N cables extending from each of said circuit members, and wherein the depth of each guide is such that N cables may pass thereover.

7. A cable guide as claimed in claim 1 wherein each first guide is in the form of a substantially cylindrical dowel.

8. A cable guide as claimed in claim 1 wherein each second guide has a generally triangular cross section with the side adjacent the circuit members being of a selected shape and the other two sides having said curve.

9. A cable guide as claimed in claim 1 wherein said first and second guides extend from a wall of the cable guide, and including a shelf extending above and behind said wall, cable being positionable on said shelf after passing between a selected first guide and second guide, and wherein the corner at the junction of the wall and the shelf has a curve with a radius greater than said minimum bend radius.

10. A cable guide as claimed in claim 1 wherein said cables are fiber optic cables with a minimum bend radius of approximately one inch, and wherein said curve radius is approximately one inch.

11. A cable guide as claimed in claim 1 wherein the second guide at each end of the cable guide has a generally semicircular cross section with a radius which is not less than said minimum bend radius.

12. A cable guide as claimed in claim 11 including means for retaining cables on said end second guides.

13. A cable guide as claimed in claim 1 including a ledge over at least the first and second guides at the ends of said cable guide, said ledge having corners at the ends of the cable guide which are rounded with a radius not less than said minimum bend radius.

14. A cable guide as claimed in claim 1 wherein the spacing between adjacent first and second guides is approximately twice the thickness of the cable.

15. A cable guide for use with a panel having a plurality of adjacent mounted circuit members, each of which has a plurality of cables extending therefrom in at least a first direction, said cables having a minimum bend radius below which performance of the cable may be impaired, said cables extending toward either end of the panel from each circuit member, the cable guide comprising:

means for mounting the cable guide to the panel on the first-direction side of the circuit members; and means for managing the running of said cables from each circuit member along selected paths, said means for managing including means for limiting the bend radius at each point along said selected paths where the direction in which a cable extends may change to a bend radius which is no less than said minimum bend radius.

16. A cable guide as claimed in claim 15 wherein said means for managing includes an effective curved surface at each of said points over which surface the cable passes and which surface has a radius which is not less than said minimum bend radius.

* * * * *